United States Patent
Excoffier et al.

(10) Patent No.: US 8,397,061 B2
(45) Date of Patent: Mar. 12, 2013

(54) UNATTENDED CODE UPDATE OF STORAGE FACILITY

(75) Inventors: Franck Excoffier, Tucson, AZ (US);
Michael P. Groover, Vail, AZ (US); Xu Han, Lincoln, CA (US); Andreas B. M. Koster, Vail, AZ (US); Edward H. Lin, Tucson, AZ (US); Mario Sweeney, Oregon City, OR (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/769,790

(22) Filed: Apr. 29, 2010

(65) Prior Publication Data

US 2011/0271100 A1    Nov. 3, 2011

(51) Int. Cl.
*H04L 9/00* (2006.01)
(52) U.S. Cl. .................. 713/156; 713/168; 713/173
(58) Field of Classification Search .......... 713/168–170, 713/173, 175, 193–194, 156; 726/26–30, 726/10
See application file for complete search history.

(56) References Cited

U.S. PATENT DOCUMENTS

| | | | |
|---|---|---|---|
| 6,301,658 B1 * | 10/2001 | Koehler | ............... 713/155 |
| 7,313,685 B2 | 12/2007 | Broyles, III et al. | |
| 7,661,018 B2 | 2/2010 | Brundidge et al. | |
| 7,685,461 B2 | 3/2010 | Brundidge et al. | |
| 7,698,562 B2 * | 4/2010 | Kusudo et al. | ............... 713/181 |

FOREIGN PATENT DOCUMENTS

WO    01/50261 A2    7/2001

* cited by examiner

*Primary Examiner* — Hosuk Song
(74) *Attorney, Agent, or Firm* — Griffiths & Seaton PLLC

(57) ABSTRACT

Various embodiments for providing an update to at least one storage facility in a computing storage environment are provided. In one embodiment, a security verification is performed on the update via a certificate authentication mechanism to confirm a validity of the update. Subsequent to confirming the validity of the update, a safety verification on the update is performed to confirm a suitability of the update to the at least one storage facility. If the security and safety verifications are validated, the update is provided and installed in the at least one storage facility.

18 Claims, 2 Drawing Sheets

UNATTENDED CODE UPDATE OF STORAGE FACILITY

BACKGROUND OF THE INVENTION

1. Field of the Invention

The present invention relates in general to computers, and more particularly to apparatus, method and computer program product embodiments for unattended update of a facility in a computing storage environment.

2. Description of the Related Art

Storage facilities such as storage servers as commonly used by corporations and other organizations have high-capacity disk arrays to store large amounts of data from external host systems. A storage facility may also backup data from another storage facility, such as at a remote site. The IBM® Enterprise Storage Server (ESS) is an example of such a storage facility. Such facilities can access arrays of disks or other storage media to store and retrieve data. Moreover, redundant capabilities may be provided as a further safeguard against data loss. For example, a dual server system includes two separate servers that can access the same storage disks.

Moreover, storage facilities include several subsystems and components, referred to as updateable elements, each requiring its own unique update image and update commands. The elements are updated from time to time to provide new features or fix problems, for instance. Elements that may be updated include host adapters, device adapters, service processors, storage disks, power components, and so forth.

SUMMARY OF THE DESCRIBED EMBODIMENTS

Because storage facilities such as ESS facilities provide storage to the remainder of data centers, for example, any updates should be performed concurrently without impacting other servers and related computing components. In addition, as will all data maintained within the storage environment, security of various hardware, firmware, and software components is a continuing concern.

A variety of conventional strategies have been utilized to perform such updates. However, these conventional strategies require extensive support during the update process. These strategies involve, for example, sending on-site support personnel to the storage facility, or requiring the user to download and insert media in the facility while remote personnel access the facility to perform the update. As a result, these conventional strategies require a large expenditure of user and support personnel resources.

In view of the foregoing, a need exists for a mechanism whereby such updates may be provided to a storage facility, while minimizing costs, yet continues to address security concerns. Accordingly, various embodiments for providing an update to at least one storage facility in a computing storage environment are provided. In one such embodiment, by way of example only, a security verification is performed on the update via a certificate authentication mechanism to confirm a validity of the update. Subsequent to confirming the validity of the update, a safety verification on the update is performed to confirm a suitability of the update to the at least one storage facility. If the security and safety verifications are validated, the update is provided and installed in the at least one storage facility.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for updating a facility, for example in a fixed state machine implementation, without the requirement of extensive on-site and/or remote support personnel. These mechanisms improve current designs by providing a safe and secure mechanism, taking advantage of redundancies in the storage facility, to provide either full or partial updates.

The mechanisms of the illustrated embodiments enhance the fixed state machine implementation by, for example, (1) insuring code integrity, and protection of the update code from media corruption or malicious code, (2) alleviating the requirement of on-site and/or remote support personnel to initiate the update process (e.g., a user may initiate the update process without requiring login, for example), (3) application of the most up-to-date logic to automatically determine whether or not to apply the update, (4) use in conjunction with a management server or application of updates directly on the storage facility itself, and (5) application to an entire code load process or portions thereof (e.g., for a more conservative approach, the mechanisms of the present invention may be used to download the code to a staging area, requiring support personnel only for an activation phase of the update, to save additional costs).

As previously mentioned, from time to time it is necessary to update code used by different elements in a storage facility. In one implementation, such code is commonly referred to as Licensed Maintenance Code (LMC). The Storage Facility includes several subsystems and components, referred to as updateable elements, each requiring its own unique update image and update commands.

Figure 1:
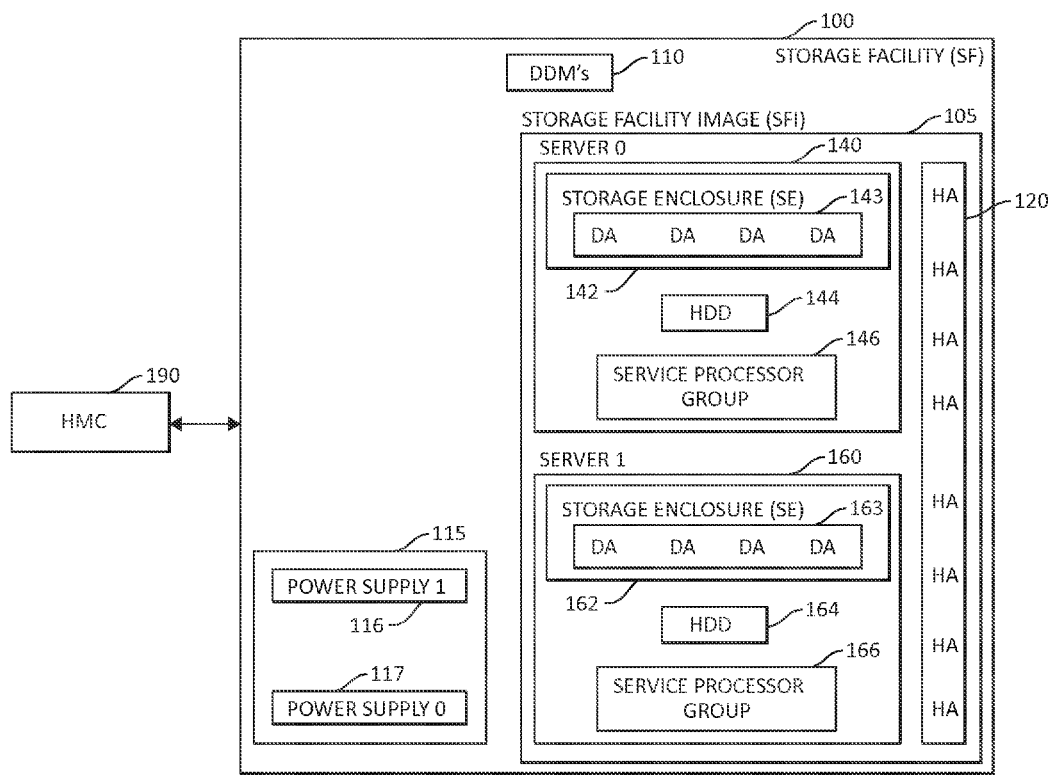
FIG. 1 illustrates a block diagram of an exemplary storage facility capable of implementing various aspects of the present invention.

FIG. 1 illustrates a block diagram of an exemplary facility (i.e., Storage Facility) in which aspects of the present invention may be implemented. An overall product includes a Hardware Management Console (HMC) 190, such as a laptop computer, and at least one Storage Facility (SF) 100. The example Storage Facility (SF) 100 includes at least one Storage Facility Image (SFI) 105 and a power supply group 115, which includes power supplies 116 and 117. In particular, the power supply group 115 includes a rack power control (RPC) and a primary power supply (PPS), which may be treated as one unit for the purposes of updating code. The SFI includes two servers (redundant servers) S0 (140) and S1 (160, and several disk drive modules (DDMs) 110, which are data storage devices for customer data, and several host adapters (HAs) 120. HAs are physical subunits of a storage server that provide the ability to attach to one or more host I/O interfaces.

Each server 140, 160 includes at least one hard disk drive (HDD) 144, 164, also referred to as a logical partition (LPAR), at least two device adapters (DAs), 143, 163, housed in at least one storage enclosure (SE) 142, 162, and a service processor group 146, 166, respectively, (sometimes referred to as Computer-Electronic Complexes (CECs)). A CEC is the set of hardware facilities associated with each server 140, 160. DAs are physical components of the Storage Facility 100 that provide communication between the servers 140, 160 and the DDMs 110.

Each of the HDDs 144, 164 has an operating system running on it, such as IBM®'s AIX 5 L operating system software, along with a driver, also referred to as SFI code. The SFI has numerous components with code for each component. The SFI code can be thought of as the main code which coordinates the activities of most of the other components and code. One aspect of the illustrated embodiments involves, in part, updating the operating system and SFI code onto the HDDs 144, 164. The service processor groups 146, 166 and the HDDs 144, 164, respectively, combine to provide the server foundation, yet the server is incomplete without the other elements.

According to one embodiment of the present invention, and as will be further described, when an update is needed, instead of requiring dispatch of a technician to the location of the Storage Facility, the user may simply insert a media 190 into an updatable unit (and/or a component in communication with an updatable unit) in the storage facility and walk away. Generally, the updateable elements include the HDD 144, 164, host adapters 120, power supply component 115, DDMs 110, storage enclosures 142, 162, device adapters 143, 163, and service processor groups 146, 166.

Figure 2:
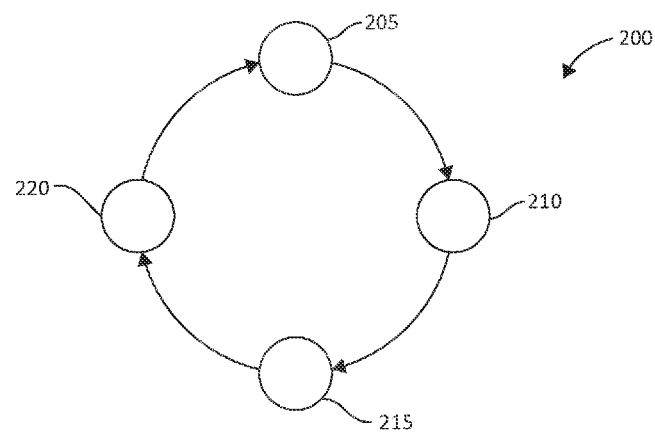
FIG. 2 illustrates an exemplary state machine for carrying out an update process.

FIG. 2, following, illustrates an exemplary state machine for carrying out an update process. One aspect of the present invention coordinates the update actions for each of the updateable elements in the context of a fixed state machine that traverses different states in a fixed sequence. The traversal of the states is repeated in successive cycles or loops. For example, a simplified state machine 200 includes states 205, 210, 215 and 220, which are traversed one at a time in the sequence shown. In practice, the present invention can traverse dozens or hundreds of different states, although an action is not necessarily performed for each updateable element in each state. Each state is associated with one or more actions that are performed in updating the elements, as detailed below.

In one embodiment, the mechanisms of the present invention may proceed in an exemplary process, following. As will be further described, this exemplary process includes three phases: a media detection phase, a security verification phase, and finally, a safety verification phase. Pursuant to the media detection phase, as was described previously, a user (or support personnel) may initiate the update by making the media available on the Storage Facility. This may include inserting the media in an updatable element (e.g., discovery of inserted CDs, DVDs or USB-based media devices), or otherwise putting the media in communication with the updatable element. Once the media is made available and detected by the Storage Facility, the user and/or support personnel may leave the Storage Facility unattended for the update process to continue.

Pursuant to the security verification phase, before any processing is performed using the data provided on the media, the data is first verified as authentic. In one embodiment, this security verification may be provided through a certificate mechanism, such as a secure socket layer (SSL) certificate authentication mechanism. The provided certificate is verified against an existing certificate on the updatable unit. Once the certificate is deemed valid, a checksum of the media contents may be extracted, and the contents of the media may be validated as unchanged, for example.

If the media does not contain a certificate, or has an invalid data format, the updatable unit may ignore the media. If the media contains an invalid certificate or other security inconsistency, email or another related notification mechanism may be used to alert the user of the problem. Once the media is determined safe, a new process may be spawned to continue the update. This new process may use libraries from the provided media, so that the logic is the most current available or applicable to the specific media. For example, if the update process is implemented in Java®, the existing implementation may be used, but the class path may point to a "patch" jar provided with the media.

Once the security verification phase concludes, a safety verification phase commences. As one of ordinary skill in the art, such safety verifications may vary according to a particular implementation. In one embodiment, for example, for updates specific to a Storage Facility, such safety verifications may include (1) validation that a model and/or serial number is correct for the provided media, (2) validation that any prerequisite code levels have been installed, (3) validation of no hardware problems that may cause an update failure, (4), choice of an optimal delegate to continue the update if the local workload is too high, and (5) scheduling of the update process to occur at a subsequent time based on workload and/or other user-defined criteria.

Once the safety verification/criteria are satisfied, the update process may continue. If any issues arise during either the safety validation or the actual update process, a notification (such as the aforementioned email or other message mechanism) may be used to alert the user of the problem, and a trained service professional may respond for a minimum amount of time. If there is a requirement to have the service professional available for critical stages of the process, all other tasks may be performed by the automated update, and the professional may manually complete the process.

Figure 3:
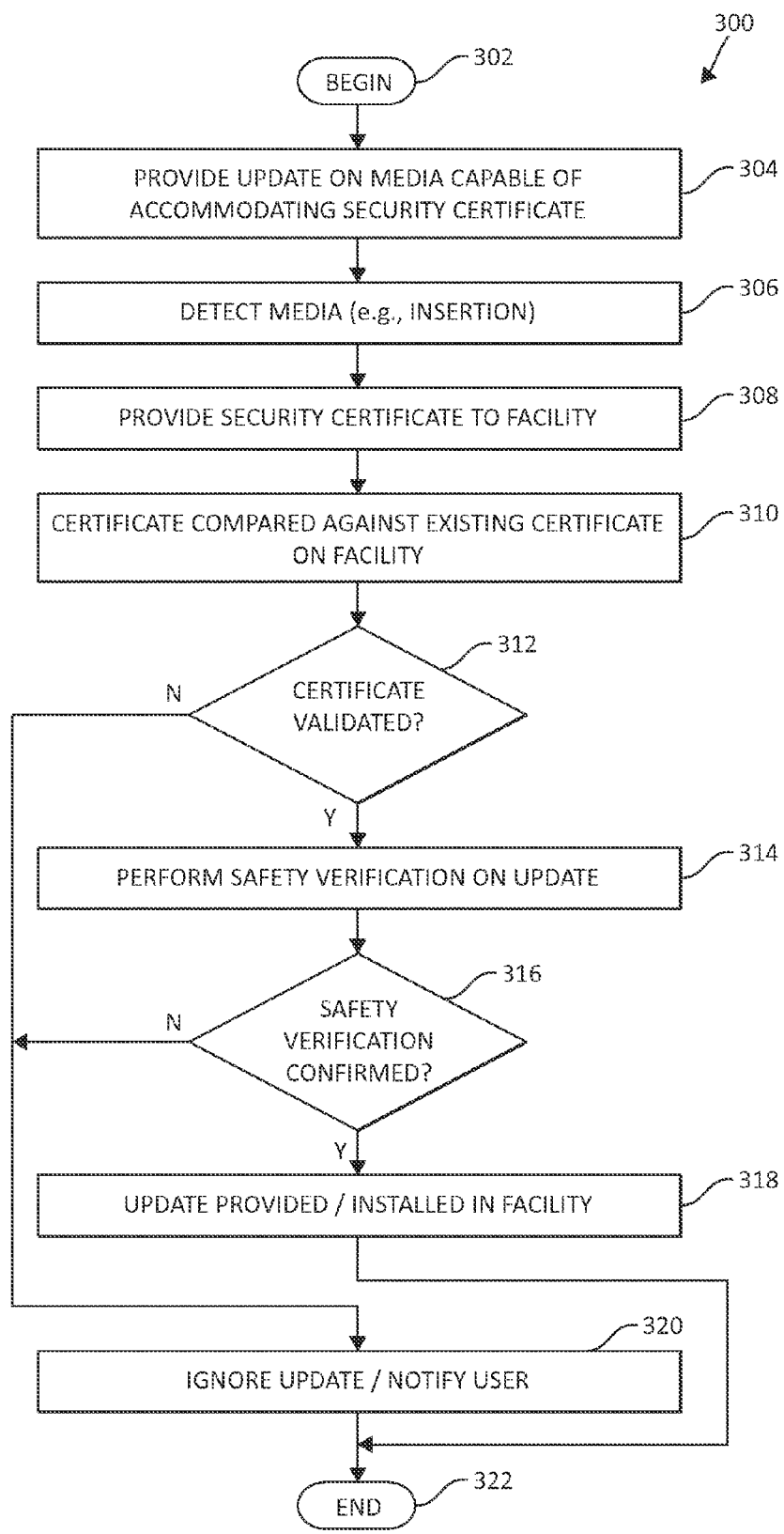
FIG. 3 illustrates a flow chart diagram of an exemplary method for updating a facility in a computing storage embodiment according to one embodiment of the present invention.

Turning to FIG. 3, following, an exemplary method 300 for updating at least one facility in a computing environment according to aspects of the present invention (such as a storage facility in a computing storage environment) is illustrated in flow chart diagram format. As one of ordinary skill in the art will appreciate, various steps in the method 300 may be implemented in differing ways to suit a particular application. In addition, the described method 300 may be implemented by various means, such as hardware, software, firmware, or a combination thereof operational on or otherwise associated with the computing environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 300 begins (step 302) by providing the update on media capable of accommodation of a security certificate (step 304). The media is detected by the facility (step 306) as it is inserted or otherwise made available by the user or support personnel. Once the media is inserted, the security phase begins as the security certificate associated with the update data is provided to the facility (step 308). The certificate is then compared against the existing certificate on the facility (step 310).

If the certificate is validated (step 312), the method 300 moves to the safety verification phase beginning with step 314. If the certificate is invalid, the facility ignores the update (step 320), and may notify the user via a message mechanism as previously described. Pursuant to step 314, one or more security verification steps may be performed on the media data. These steps may include the aforementioned steps described previously, such as determining that a model and/or serial number correctly corresponds to the update data. If each of the security verification steps are passed (step 316), the update is provided and installed in the facility (step 318), and the method 300 ends.

Returning to step 316, if one or more of the security verification steps fail, the method 300 again moves to step 320, where the update is ignored and/or a notification is provided to the user. In some cases, the user and/or support personnel may be able to address a safety concern (such as ignoring an alert flag), and may manually allow the process to continue (again, returning to step 318). Once the update is installed, the method 300 ends (step 322).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for providing an update to at least one storage facility in a computing storage environment by a processor device, comprising:
performing, using the processor device, a security verification on the update via a certificate authentication mechanism to confirm a validity of the update; and
subsequent to confirming the validity of the update, performing, using the processor device, a safety verification on the update to confirm a suitability of the update to the at least one storage facility, wherein if the security and safety verifications are validated, the update is provided and installed in the at least one storage facility,
wherein performing the safety verification on the update includes performing at least:
validating at least one of a model number and a serial number against a provided media having the update,
validating installation of at least one prerequisite media level,
validating the update as newer than an existing media level,
validating a hardware configuration,
choosing an optimal delegate to continue installation of the update if a local workload is excessive, and
scheduling installation of the update to occur at a later time.

2. The method of claim 1, wherein scheduling installation of the update to occur at the later time is performed pursuant to a workload determination or a user input.

3. The method of claim 1, further including providing the update on a media capable of accommodating a certificate.

4. The method of claim 1, further including detecting the media as in communication with the at least one storage facility.

5. The method of claim 1, further including, pursuant to performing the security verification on the update via the certificate authentication mechanism, providing a certificate to the at least one storage facility, and verifying the certificate against an existing certificate on the at least one storage facility.

6. The method of claim 5, further including, if the certificate is unverified against the existing certificate, performing at least one of ignoring the update and notifying a user.

7. A system for providing an update to at least one storage facility in a computing storage environment, comprising:
a processor device, operable in the computing storage environment, wherein the processor device is adapted for:
performing a security verification on the update via a certificate authentication mechanism to confirm a validity of the update,
subsequent to confirming the validity of the update, performing a safety verification on the update to confirm a suitability of the update to the at least one storage facility, wherein if the security and safety verifications are validated, the update is provided and installed in the at least one storage facility, and
pursuant to performing the safety verification on the update, performing at least:
validating at least one of a model number and a serial number against a provided media having the update,
validating installation of at least one prerequisite media level,
validating the update as newer than an existing media level,
validating a hardware configuration,
choosing an optimal delegate to continue installation of the update if a local workload is excessive, and
scheduling installation of the update to occur at a later time.

8. The system of claim 7, wherein the processor device is further adapted for performing the scheduling installation of the update to occur at the later time pursuant to a workload determination or a user input.

9. The system of claim 7, wherein the processor device is further adapted for providing the update on a media capable of accommodating a certificate.

10. The system of claim 7, wherein the processor device is further adapted for detecting the media as in communication with the at least one storage facility.

11. The system of claim 7, wherein the processor device is further adapted for, pursuant to performing the security verification on the update via the certificate authentication mechanism, providing a certificate to the at least one storage facility, and verifying the certificate against an existing certificate on the at least one storage facility.

12. The system of claim 11, wherein the processor device is further adapted for, if the certificate is unverified against the existing certificate, performing at least one of ignoring the update and notifying a user.

13. A computer program product for providing an update to at least one storage facility in a computing storage environment by a processor device, the computer program product comprising a non-transitory computer-readable storage medium having computer-readable program code portions stored therein, the computer-readable program code portions comprising:
a first executable portion for performing a security verification on the update via a certificate authentication mechanism to confirm a validity of the update;
a second executable portion for, subsequent to confirming the validity of the update, performing a safety verification on the update to confirm a suitability of the update to the at least one storage facility, wherein if the security and safety verifications are validated, the update is provided and installed in the at least one storage facility; and
a third executable portion for, pursuant to performing the safety verification on the update, performing at least:
validating at least one of a model number and a serial number against a provided media having the update,
validating installation of at least one prerequisite media level,
validating the update as newer than an existing media level,
validating a hardware configuration,
choosing an optimal delegate to continue installation of the update if a local workload is excessive, and
scheduling installation of the update to occur at a later time.

14. The computer program product of claim 13, wherein the third executable portion for scheduling installation of the update to occur at the later time is performed pursuant to a workload determination or a user input.

15. The computer program product of claim 13, further including a third executable portion for providing the update on a media capable of accommodating a certificate.

16. The computer program product of claim 13, further including a third executable portion for detecting the media as in communication with the at least one storage facility.

17. The computer program product of claim 13, further including a third executable portion for, pursuant to performing the security verification on the update via the certificate authentication mechanism, providing a certificate to the at least one storage facility, and verifying the certificate against an existing certificate on the at least one storage facility.

18. The computer program product of claim 17, further including a fourth executable portion for, if the certificate is unverified against the existing certificate, performing at least one of ignoring the update and notifying a user.

* * * * *